United States Patent
Cho et al.

(10) Patent No.: US 8,014,784 B2
(45) Date of Patent: Sep. 6, 2011

(54) SYSTEM AND METHOD FOR ALLOCATING A CHANNEL IN A COMMUNICATION SYSTEM

(75) Inventors: Myeon-Gyun Cho, Seongnam-si (KR); Yung-Soo Kim, Seongnam-si (KR); Hyung-Myung Kim, Daejeon (KR); Tae-Sung Kang, Seoul (KR); Dae-Hyun Kim, Seongnam-si (KR); Woo-Geun Ahn, Yeongcheon-si (KR)

(73) Assignees: Samsung Electronics Co., Ltd. (KR); Korea Advanced Institute of Science and Technology (KAIST) (KR)

( * ) Notice: Subject to any disclaimer, the term of this patent is extended or adjusted under 35 U.S.C. 154(b) by 636 days.

(21) Appl. No.: 11/706,853

(22) Filed: Feb. 15, 2007

(65) Prior Publication Data

US 2007/0207810 A1    Sep. 6, 2007

(30) Foreign Application Priority Data

Feb. 15, 2006 (KR) .................. 10-2006-0014709

(51) Int. Cl.
*H04W 72/00* (2009.01)
*H04B 7/00* (2006.01)
*H04L 12/50* (2006.01)
(52) U.S. Cl. .................. 455/450; 455/513; 370/338
(58) Field of Classification Search .......... 455/450
See application file for complete search history.

(56) References Cited

U.S. PATENT DOCUMENTS

| 2003/0128658 A1* | 7/2003 | Walton et al. ............... 370/208 |
| 2005/0063336 A1 | 3/2005 | Kim et al. |
| 2005/0111429 A1 | 5/2005 | Kim et al. |
| 2005/0169229 A1* | 8/2005 | Cho et al. ................... 370/344 |
| 2005/0272432 A1* | 12/2005 | Ji et al. ........................ 455/449 |
| 2007/0026810 A1* | 2/2007 | Love et al. ............... 455/67.11 |
| 2007/0124774 A1* | 5/2007 | Roberts et al. ............... 725/62 |
| 2007/0177555 A1* | 8/2007 | Brueck et al. ............... 370/338 |

FOREIGN PATENT DOCUMENTS

| EP | 1 619 913 A1 | 1/2006 |
| WO | WO 02/49305 A2 | 6/2002 |

* cited by examiner

*Primary Examiner* — Lester Kincaid
*Assistant Examiner* — Andy Gu
(74) *Attorney, Agent, or Firm* — The Farrell Law Firm, P.C.

(57) ABSTRACT

A method and system for allocating a channel are provided in a communication system including a plurality of Mobile Stations (MSs) and Base Stations (BSs) for providing a communication service to the plurality of MSs. A BS transmits an average Channel Quality Information (CQI) request to MSs. The MSs measure CQI with respect to their channels in response to the request from the BS, compute average CQI from the measured CQI, and transmit the average CQI to the BS. The BS selects a predefined number of MSs according to the average CQI received from the MSs and sets an MS group. The BS transmits a CQI request to the MS group. The MSs of the MS group transmit the CQI to the BS. The BS receives the CQI from the MS group and allocates a channel according to the CQI.

4 Claims, 6 Drawing Sheets

SYSTEM AND METHOD FOR ALLOCATING A CHANNEL IN A COMMUNICATION SYSTEM

PRIORITY

This application claims priority under 35 U.S.C. §119 to an application filed in the Korean Intellectual Property Office on Feb. 15, 2006 and assigned Ser. No. 2006-14709, the contents of which are incorporated herein by reference.

BACKGROUND OF THE INVENTION

1. Field of the Invention

The present invention generally relates to a communication system, and more particularly to a system and method for allocating a channel in a communication system.

2. Description of the Related Art

With the development of cellular type wireless mobile telecommunication systems in the U.S. at the end of the 1970's, a voice communication service began to be provided to users through an Advanced Mobile Phone Service (AMPS) system serving as a first generation (1G) analog type mobile communication system. A Code Division Multiple Access (CDMA) system serving as a second generation (2G) mobile communication system was commercialized to provide users with voice and low rate data services in the middle of the 1990's.

An International Mobile Telecommunication-2000 (IMT-2000) system serving as a third generation (3G) mobile communication system has been partially commercialized to provide improved wireless multimedia services, global roaming, and high rate data services from the end of the 1990's. In particular, the 3G mobile communication system has been developed to provide high rate data as an amount of service data increases quickly in the mobile communication system.

The 3G mobile communication system has evolved into a fourth generation (4G) mobile communication system. The 4G mobile communication system is being standardized to provide efficient interworking with wired and wireless communication networks and an integrated service as well as the simple wireless communication service provided by the previous generation communication system. Thus, technologies are needed to provide large capacity data in wireless communication networks as in wired communication networks.

Active research is being conducted on an Orthogonal Frequency Division Multiplexing (OFDM) scheme and an Orthogonal Frequency Division Multiple Access (OFDMA) scheme useful for transmitting high rate data on wired/wireless channels in the 4G mobile communication system. According to the OFDM scheme, a multicarrier is used to transmit data. The OFDM scheme is a type of Multi Carrier Modulation (MCM) scheme in which a serial symbol stream is converted into parallel symbol streams and is modulated into multiple subcarriers, i.e., multiple subcarrier channels that are orthogonal to each other.

A mobile communication system for transmitting data using a multicarrier is a system in which one OFDM symbol is divided into subcarriers such that multiple users employ the subcarriers. The mobile communication system employs multiple subcarriers. Among the multiple subcarriers, some subcarriers are employed as pilot subcarriers. Except for the pilot subcarriers, the remaining subcarriers are employed as data subcarriers. Further, the mobile communication system divides the data subcarriers in a unit of a predetermined number of subcarriers, generates subchannels, and allocates the generated subchannels to multiple users according to the system.

Figure 1:
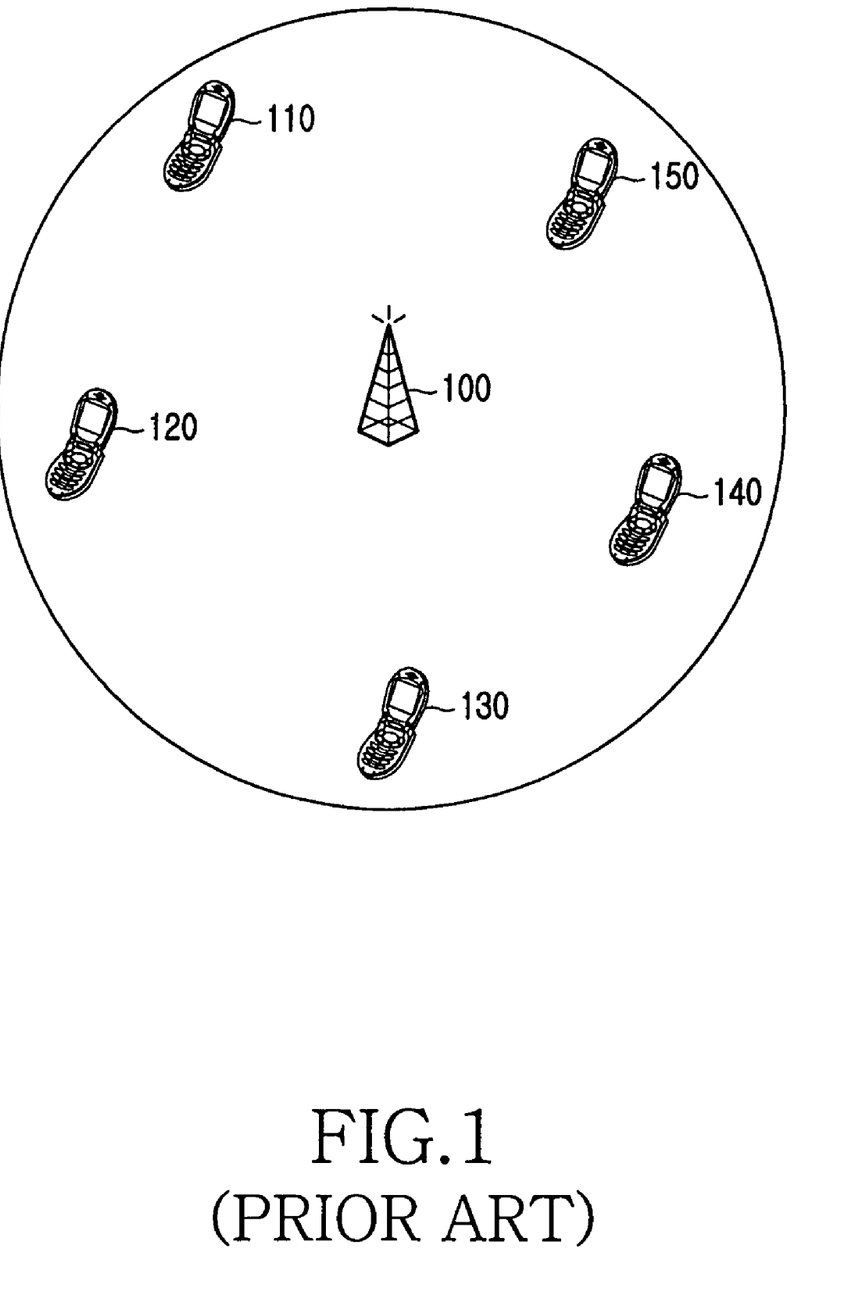
FIG. 1 illustrates a structure of a conventional mobile communication system.

Subchannels mean a channel including of multiple subcarriers. Consequently, the mobile communication system aims to obtain a frequency diversity gain by distributing all used subcarriers, particularly data subcarriers, over a total frequency band. A structure of the mobile communication system using the above-described multicarrier is illustrated in FIG. 1.

The mobile communication system has a single cell structure. The mobile communication system is configured with a Base Station (BS) 100 and Mobile Stations (MSs) 110, 120, 130, 140, and 150 managed by the BS 100.

Figure 2:
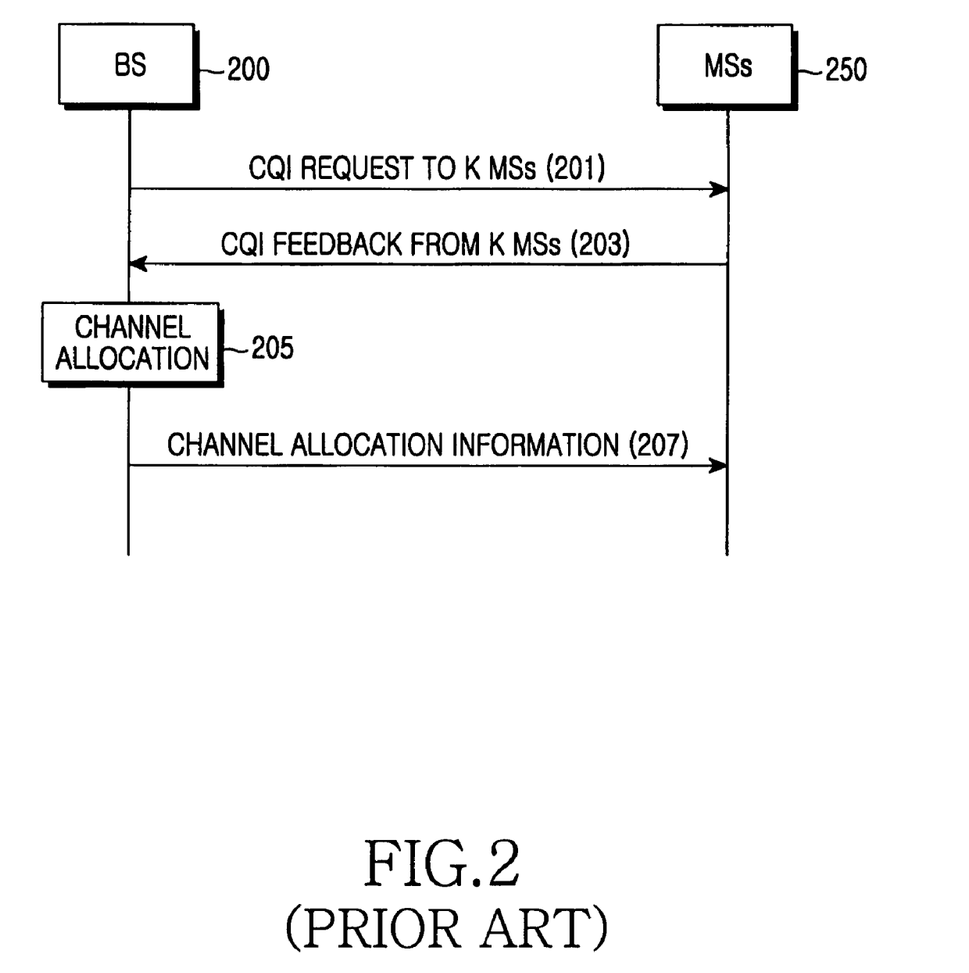
FIG. 2 is a signal flow diagram illustrating a channel allocation process of the conventional mobile communication system.

Environments of channels measured by the MSs 110, 120, 130, 140, and 150 are independent of each other due to shadowing loss, path loss, MS movement, etc., and are time-variant. Because of the above-described channel characteristics, the BS 100 allocates subchannels to the MSs while considering the channel environments, thereby increasing data transmission efficiency of the overall system. The BS 100 applies an Adaptive Modulation and Coding (AMC) scheme while considering reception channel environments of the MSs 110, 120, 130, 140, and 150. That is, a high efficiency modulation and coding scheme is applied when a channel environment is good, whereas a low efficiency modulation and coding scheme is applied when a channel environment is bad. A channel allocation process of the mobile communication system is illustrated in FIG. 2.

The mobile communication system includes a BS 200 and K MSs 250. K is the total number of MSs located in a service area of the BS, i.e., a cell.

The BS 200 transmits a Channel Quality Information (CQI) request to the K MSs 250 for receiving a service therefrom in step 201. In response to the CQI request, the MSs 250 measure CQI of respective subchannels. At this time, each MS selects a predetermined number of subchannels with a better CQI among the measured subchannels.

Then, the MSs 250 feed back the measured CQI to the BS 200 in step 203. The CQI reported by each MS is the CQI of the selected subchannels. The MSs 250 transmit the CQI to the BS 200 in a regular period.

When the CQI is transmitted, the MSs 250 transmit information about the selected subchannels in the form of a bitmap in which a selected subchannel is set to a bit of 1 and an unselected subchannel is set to a bit of 0. When the subchannels selected by the MS are successive, a value of a start subchannel index and, for example, a value of N representing the number of subchannels selected by the MS are transmitted together with the CQI. According to whether the subchannels selected by the MS are successive, information about the selected subchannels is transmitted to the BS 200.

The BS 200 receives the CQI and the subchannel information and performs a channel allocation process, i.e., a subchannel allocation process, using the CQI and the subchannel information in step 205.

The BS 200 transmits channel allocation information to an associated MS according to the channel allocation process in step 207. When the channel allocation scheme as illustrated in FIG. 2 is employed, the BS 200 should receive the CQI of all MSs located in the service area thereof. In the current mobile communication system, a channel state of subchannels allocated to each MS is continuously varied. The respective MSs should feed back the varied CQI of the subchannels so the BS 200 can perform the channel allocation process.

However, there is a problem in that an operation for frequently feeding back CQI of subchannels of all MSs leads to signaling overhead and a signaling operation for feeding back the CQI of the subchannels leads to uplink interference in the mobile communication system.

Thus, a need exists for a method for efficiently performing a channel allocation process while supporting a high-speed mobile communication service in a mobile communication system.

SUMMARY OF THE INVENTION

It is, therefore, an object of the present invention to provide a system and method for allocating a channel in a communication system.

It is another object of the present invention to provide a channel allocation system and method that can minimize a collision between adjacent subchannels in a communication system.

It is yet another object of the present invention to provide a channel allocation system and method that can reduce signaling overhead in feedback to a base station in a communication system.

In accordance with the present invention, there is provided a method for allocating a channel in a communication system including a plurality of Mobile Stations (MSs) and a Base Station (BS) for providing a communication service to the plurality of MSs, by the BS, the method including transmitting an average Channel Quality Information (CQI) request from a BS to MSs; selecting a predefined number of MSs according to the average CQI received from the MSs and setting an MS group in the BS; transmitting a CQI request to the MS group; and receiving the CQI from the MS group and allocating a channel according to the CQI.

In accordance with the present invention, there is provided a method for allocating a channel in a communication system including a plurality of MSs and a BS for providing a communication service to the plurality of MSs, by the MS, the method including measuring CQI with respect to channels of the MS in response to an average CQI from the BS, computing an average CQI from the measured CQI, and transmitting the average CQI to the BS; and transmitting a CQI to the BS in response to the CQI from the BS.

In accordance with the present invention, there is provided a system for allocating a channel in a communication system including a BS for transmitting an average CQI request to MSs, selecting a predefined number of MSs using the average CQI received from the MSs, setting an MS group, transmitting a CQI request to the MS group, and allocating a channel according to the CQI when receiving the CQI from the MS group.

In accordance with the present invention, there is provided a system for allocating a channel in a communication system including an MS for transmitting average CQI computed by averaging CQI measured on a channel-by-channel basis in response to an average CQI request of a BS and transmitting the CQI to the BS in response to a CQI request from the BS.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following description, detailed descriptions of functions and configurations incorporated herein that are well known to those skilled in the art are omitted for clarity and conciseness.

The present invention provides a method for allocating a channel while considering an average channel gain in a mobile communication system. A Base Station (BS) receives average Channel Quality Information (CQI) of Mobile Stations (MSs). According to the average CQI, the BS sets an MS group including a preset number of MSs, receives the CQI from the MSs of the set group, and allocates a channel.

When setting the MS group, the BS receives the average CQI from the respective MSs. For example, the CQI can be a Carrier to Interference and Noise Ratio (CINR) or a Signal to Noise Ratio (SNR). Thus, the BS sets the MS group with a high possibility that subchannels will be allocated according to an average value of the CQI, i.e., the average CQI. The BS receives the CQI from MSs of the set MS group and allocates a channel using the received CQI, thereby reducing an amount of information fed back from the MSs for receiving a service from the BS.

Figure 3:
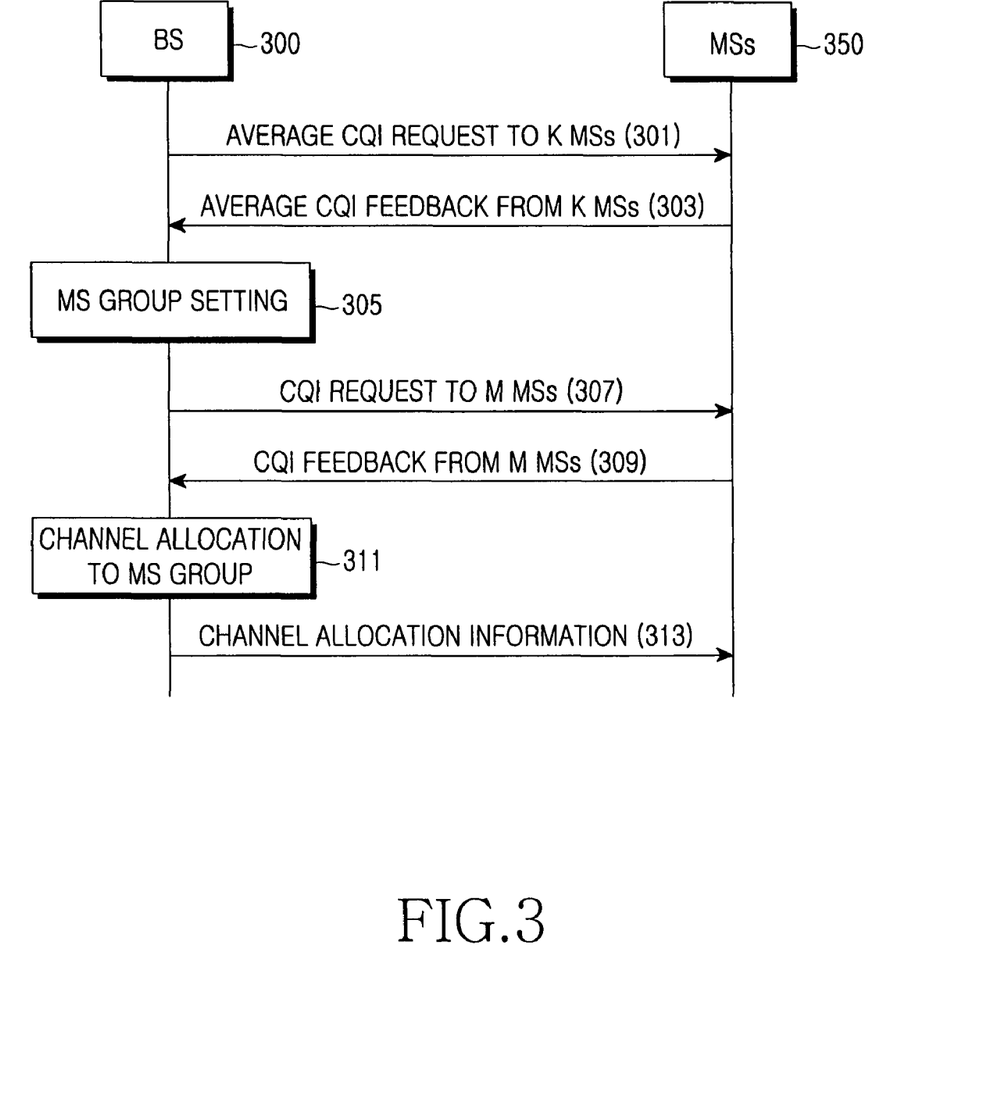
FIG. 3 is a signal flow diagram illustrating a channel allocation process of a mobile communication system in accordance with the present invention.

With reference to FIG. 3, an operation for allocating a channel from the BS to the MSs in the mobile communication system in the present invention will be described.

The mobile communication system includes a BS 300 and K MSs 350. K is the total number of MSs located in a service area of the BS, i.e., a cell.

The BS 300 transmits an average CQI request to the K MSs 350 for receiving a service therefrom in step 301. In response to the average CQI request, the MSs 350 measure the CQI of respective subchannels. At this time, each MS selects a predetermined number of subchannels in which the CQI, i.e., channel gain is high among the measured subchannels. Then, the MS computes an average of the CQI with respect to the subchannels selected thereby.

In response to the average CQI request, the MSs 350 transmit, to the BS 300, the average CQI computed thereby in step 303. The average CQI reported by each MS is the average value of the CQI computed with respect to the selected subchannels.

The BS 300 analyzes the average CQI, sequentially arranges the MSs in a descending order of average channel gain values, and sets a group of a preset number of MSs in arranged order in step 305. The MS with a high average channel gain has a high possibility that subchannels will be allocated. Assuming that the preset number of MSs is M, an MS group of the M MSs is set.

The BS 300 can use the number of MSs of the MS group, i.e., a predefined value of M, and can use a value of M computed by a Proportional Fairness (PF) scheduling scheme or a Max Carrier to Interference (Max C/I) scheduling scheme.

When the PF scheduling scheme is used, the BS 300 sets M such that a PF matrix has a maximum value in each time slot. In this case, M is set by Equation (1).

$$M^* = \underset{M}{\arg\max} \sum_{k=1}^{K} \log(R_k - C(M)/K) \quad (1)$$

In Equation (1), $R_k$ is an average throughput of MS k, and C(M) is overhead of control information for a Modulation and Coding Scheme (MCS) and subchannel allocation information proportional to M.

When the Max C/I scheduling scheme is used, the BS 300 sets M such that the average throughput is maximal. In this case, M is set by Equation (2).

$$M^* = \underset{M}{\arg\max} \left\{ \sum_{k=1}^{K} R_k - C(M) \right\} \quad (2)$$

In Equation (2), $R_k$ is an average throughput of MS k, and C(M) is overhead of control information for the MCS and subchannel allocation information proportional to M as in Equation (1).

Thus, the BS 300 sets an optimal M value when matrices of Equations (1) and (2) have a maximum value, respectively. Because the M value is the number of MSs, it is an integer. The M value is set through a full search by inserting a value in the range of $1 \leq M \leq K$. Because the number of users performing simultaneous transmissions averagely selected at the time of initial decision is a value less than or equal to $$\frac{K}{2},$$

the M value is set by inserting a value in the range of $$1 \leq M \leq \frac{K}{2}.$$

When the M value is set again by a changed K value, $K'=K+\Delta$ where K' is the changed K value. The range of the M value is set again by the $\Delta$ value. A range of M' to be set again by the $\Delta$ value is defined as shown in Equation (3).

$$\Delta > 0, M' \in \left[ M, M + \frac{\Delta}{2} \right] \quad (3)$$
$$\Delta < 0, M' \in \left[ M + \frac{\Delta}{2}, M \right]$$

Since the number M of MSs of the MS group depends upon the total number of MSs, it should be set again when the total number of MSs is changed. The M MSs of the MS group are set in a descending order of instantaneous transmission rates $r_k(i)$ in an arbitrary slot i. Alternatively, the M MSs of the MS group may be set in a descending order of values representing a ratio of an instantaneous transmission rate and an average transmission rate, $r_k(i)/R_k'(i)$, in an arbitrary slot i.

The BS 300 transmits a CQI request to the set M MSs of the MS group in step 307. In response to the CQI request from the BS, the MSs of the MS group provide the BS with the feedback of the CQI of a predetermined number of subchannels with better CQI. Further, the MSs transmit information about the subchannels to the BS. Along with the CQI, the subchannel information is transmitted in the form of a bitmap in which a selected subchannel is set to a bit of 1 and an unselected subchannel is set to a bit of 0.

If the subchannels selected by the MS are successive when the subchannel information is transmitted to the BS, a value of a start subchannel index and, for example, a value of N representing the number of subchannels selected by the MS are transmitted together with the CQI. According to whether the subchannels selected by the MS are successive, the subchannel information is transmitted to the BS 300 along with the CQI.

Then, the BS 300 receives the CQI and the subchannel information and performs a channel allocation process, i.e., a subchannel allocation process in step 311. The BS 300 selects an MS from the MS group according to the average CQI in each slot. That is, the BS 300 selects the MS whose subchannel has a higher SNR than an average SNR in a slot. Then, the BS 300 allocates a channel to the selected MS. The BS 300 selects the MS as shown in Equation (4).

$$k = \underset{k \in U_M(i)}{\arg\max} \frac{r_{k,n}(i)}{r_k(i)}, \forall n \quad (4)$$

In Equation (4), k is an MS index, n is a subchannel index, $r_k(i)$ is an instantaneous transmission rate according to CQI in an i-th time slot, $r_{k,n}(i)$ is an instantaneous transmission rate according to CQI of an n-th subchannel of MS k in an i-th time slot, and $U_M(i)$ is an MS group selected in an i-th time slot. That is, when the channel allocation process is performed, the MS is assigned a channel in which a difference between the CQI and average CQI is largest.

Since the above-described channel allocation process is performed for the MS group, The CQI and subchannel information of all MSs within the cell of the BS 300 are not transmitted to the BS 300, such that feedback information is reduced. Next, an operation process of the BS will be described with reference to FIG. 4.

Figure 4:
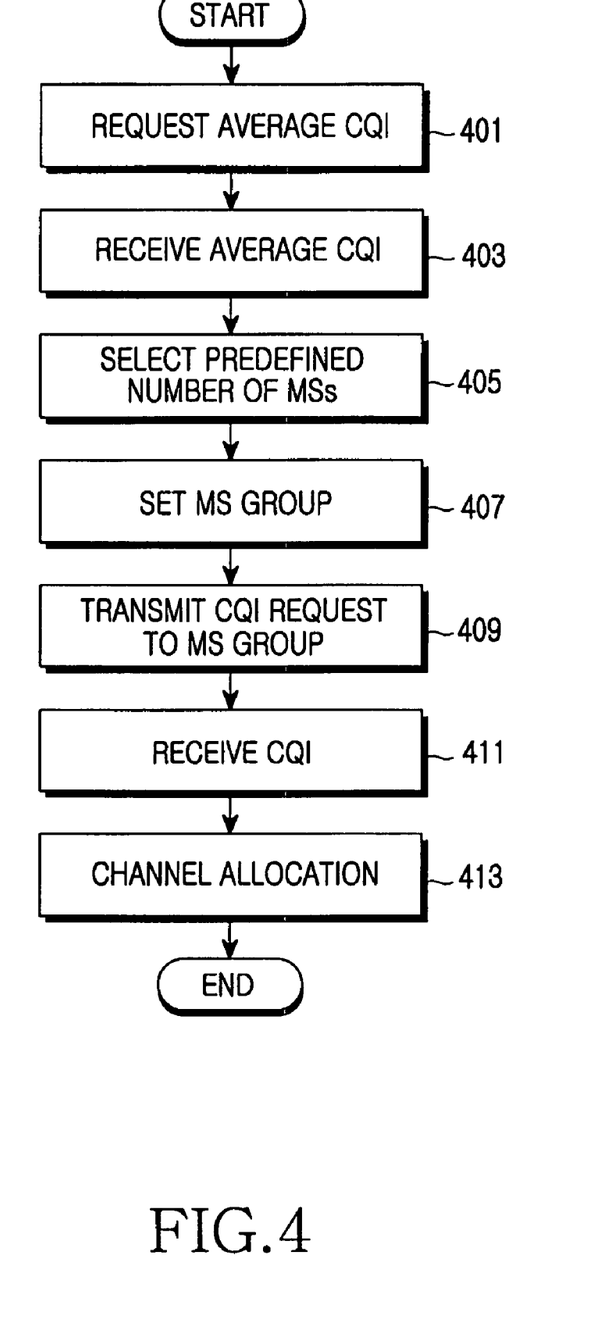
FIG. 4 is a flowchart illustrating an operation process for allocating a channel in a base station of the mobile communication system in accordance with the present invention.

The BS transmits an average CQI request to MSs for receiving a service therefrom in step 401 and then proceeds to step 403. The BS receives average CQI from the MSs in response to the average CQI request in step 403 and then proceeds to step 405. At this time, the average CQI is computed with respect to a predetermined number of subchannels with better CQI. Alternatively, the average CQI may be computed with respect to all subchannels.

The BS selects a predefined number of MSs with better channel quality in step 405 and then proceeds to step 407. The BS analyzes the received average CQI and selects a predefined number M of MSs according to channel state. At this time, a user can preset the M value. Alternatively, M may be set to a predefined value as described with reference to FIG. 3. The number M of MSs can be set using Equations (1) and (2). According to the channel state, the BS selects the M MSs in sequence from an MS with the best channel state. As described above, the MSs may be selected in descending order of instantaneous transmission rates in an arbitrary slot, and may be selected in a descending order of values representing a ratio of an instantaneous transmission rate and an average transmission rate.

The BS sets the selected MSs to an MS group for channel allocation in step 407 and then proceeds to step 409. The MS group is set by the selected M MSs. The set MS group is the MSs whose channel quality is better than that of an unselected MS. As described above, the MSs are selected which have a high possibility that a channel will be allocated according to better channel quality, such that the selected MSs are set to the MS group. Therefore, the set MS group includes MSs with a high channel gain.

The BS transmits a CQI request to the MS group in step 409 and then proceeds to step 411. The BS receives the CQI in step 411 and then proceeds to step 413. The BS can receive a CQI from the respective MSs of the MS group. The CQI of a predetermined number of subchannels with better channel quality among the subchannels of the MSs can be transmitted. In this case, channel information of the subchannels with better channel quality can be transmitted along with the CQI. When the channel information includes indices of subchannels with better channel quality or indicates that the subchannels are successive, subchannel information can be received which includes information about a subchannel start point and the number of subchannels.

In step 413, the BS allocates a channel to the MSs using the received CQI. The BS allocates subchannels while considering channel quality using the CQI of the subchannels. At this time, the BS allocates a channel to the MS with the best channel quality among the MSs of the MS group in each time slot. Next, an operation process of an MS according to channel allocation of the BS will be described with reference to FIG. 5.

Figure 5:
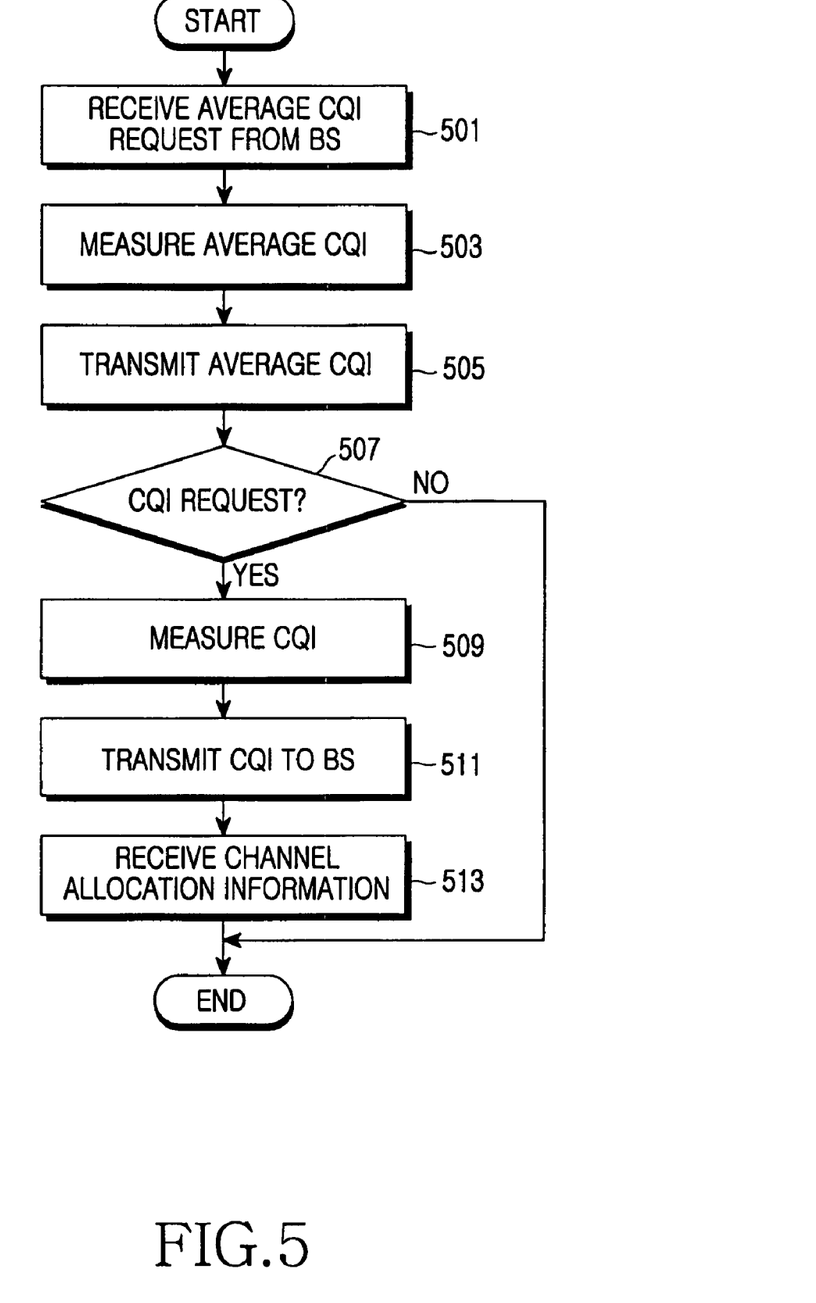
FIG. 5 is a flowchart illustrating an operation process in which a mobile station is assigned a channel in the mobile communication system in accordance with the present invention.

The MS receives an average CQI request from the BS in step 501 and then proceeds to step 503. The MS measures its average CQI in response to the average CQI request in step 503 and then proceeds to step 505. When measuring the average CQI in response to the average CQI request of the BS, the MS measures the average CQI with respect to all subchannels or measures the average CQI with respect to a predefined number of subchannels with a better channel state. The predefined number of subchannels is the number of subchannels with a better channel state in the MS.

The MS transmits the measured average CQI to the BS in step 505 and then proceeds to step 507.

In step 507, the MS determines whether a CQI request from the BS is present. When determining that the CQI request from the BS is absent after a period of time has elapsed in step 507, the channel allocation process ends.

However, if the CQI request from the BS is present, the MS proceeds to step 509. If the CQI request is present, the MS belongs to an MS group set in the BS.

The MS measures the CQI in step 509 and then proceeds to step 511. The CQI is measured with respect to respective subchannels.

The MS transmits the measured CQI to the BS in step 511 and then proceeds to step 513. The MS transmits channel information, i.e., subchannel indices, and a CQI of subchannels with better CQI, i.e., subchannels predefined in sep 503. When the subchannel indices are transmitted, a bitmap scheme can be used. When the subchannels are successive, a value of a start subchannel index and the number of subchannels selected by the MS is transmitted to the BS together with the CQI.

In step 513, the MS receives channel allocation information from the BS and communicates with the BS through an allocated channel.

As described with reference to FIGS. 4 and 5, only a CQI for a set MS group is fed back from the MSs to the BS. Therefore, feedback information from the MSs to the BS for the channel allocation is reduced.

Figure 6:
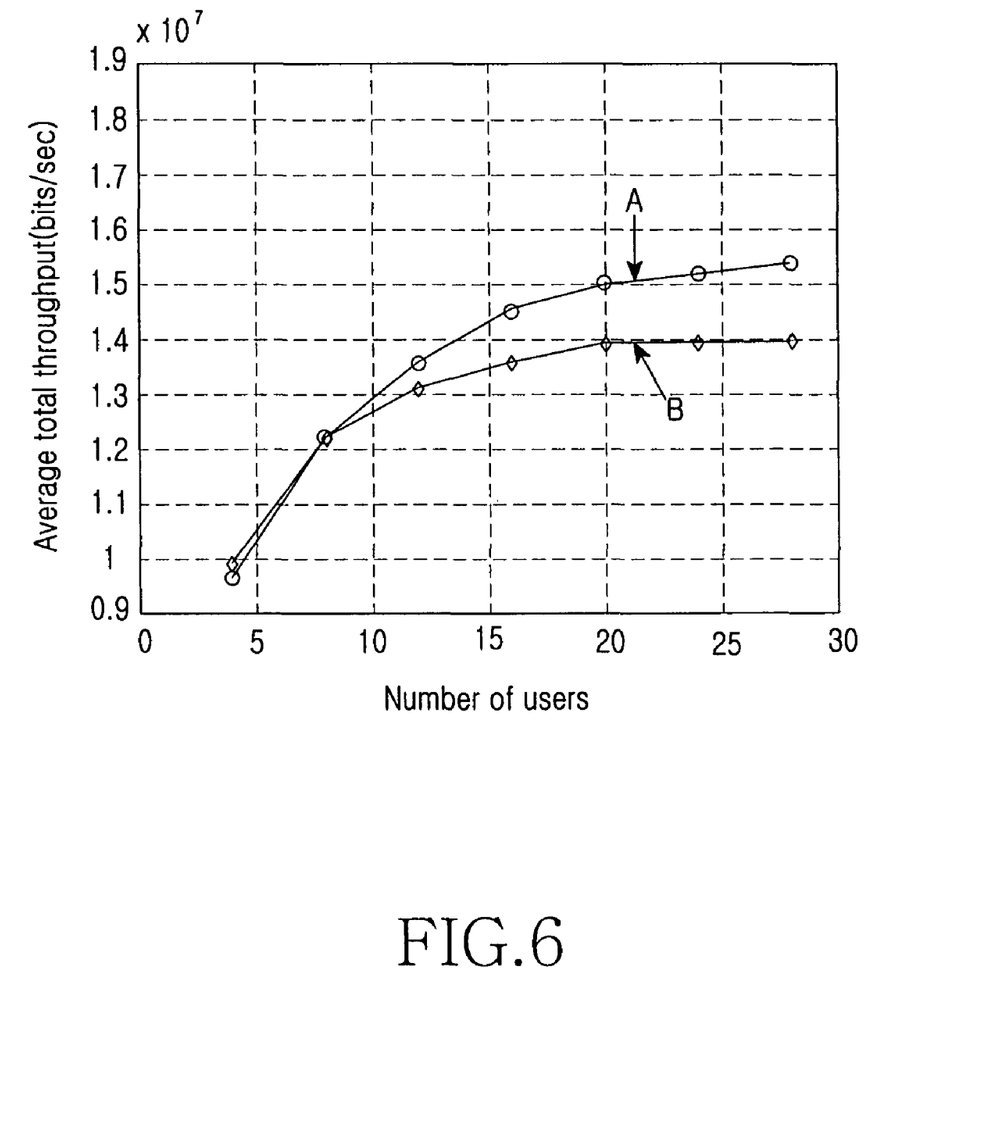
FIG. 6 is a performance graph illustrating the throughput according to an increase in the number of users for channel allocation in the mobile communication system in accordance with the present invention.

FIG. 6 illustrates the average throughput of a system according to the number of MSs. The horizontal axis represents the number of MSs and the vertical axis represents the average throughput. The graph of FIG. 6 illustrates the average throughput of the system in the case where MSs located in a cell of a BS have the same CQI, for example, an SNR of 10 dB.

The average throughput of a conventional system is denoted by B in the graph and the average throughput of the system of the present invention is denoted by A in the graph. From the graph, it can be seen that the system throughput increases as the number of MSs increases since an amount of feedback data from the MSs to the BS decreases. The present invention sets the number of MSs for performing simultaneous transmissions, i.e., an MS group, and performs a channel allocation process for the MS group. Through the graph of FIG. 6, it can be seen that the proposed channel allocation method outperforms the conventional channel allocation method in terms of an actual system throughput.

In the present invention, an example in which channel allocation is performed in a subchannel unit has been described. Alternatively, the BS can assign a channel in a subcarrier unit and a band unit as well as the subchannel unit.

The present invention can provide a channel allocation system that can minimize a collision between adjacent subchannels in a communication system in which a BS receives average CQI, sets an MS group for channel allocation, and performs the channel allocation. Further, the present invention can reduce signaling overhead in the communication system in which control information for the channel allocation fed back to the BS, i.e., channel allocation information and channel information can be reduced. Therefore, an uplink interference signal is reduced in the communication system, such that the system throughput increases.

Although preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for allocating a channel in a communication system comprising a plurality of Mobile Stations (MSs) and a Base Station (BS) for providing a communication service to the plurality of MSs, by the BS, the method comprising:
   transmitting an average Channel Quality Information (CQI) request to the plurality of MSs;
   selecting a predefined number of MSs in a descending order of instantaneous transmission rates in an arbitrary slot or a descending order of ratios of an instantaneous transmission rate and an average transmission rate in the arbitrary slot, from the plurality of MSs and setting an MS group including the predefined number of MSs;
   transmitting a CQI request only to each of the predefined number of MSs included in the MS group;
   receiving a CQI from only each of the predefined number of MSs included in the MS group; and
   selecting, from each time slot, an MS from the predefined number of MSs with a largest difference between an instantaneous transmission rate and an average CQI for each of the predefined number of MSs; and
   allocating the channel to the selected MS.

2. The method of claim 1, wherein the CQI is a signal to noise ratio (SNR).

3. A system for allocating a channel in a communication system comprising a plurality of Mobile Stations (MSs) and a Base Station (BS) for providing a communication service to the plurality of MSs, the system comprising:

the BS for transmitting an average CQI request to the plurality of MSs, selecting a predefined number of MSs in a descending order of instantaneous transmission rates in an arbitrary slot or a descending order of ratios of an instantaneous transmission rate and an average transmission rate in the arbitrary slot, from the plurality of MSs, wherein the predefined number of MSs is less than the plurality of MSs, setting an MS group including the predefined number of MSs, transmitting a CQI request only to each of the predefined number of MSs in the MS group, receiving a CQI from only each of the predefined number of MSs included in the MS group, selecting, from each time slot, an MS from the predefined number of MSs with a largest difference between an instantaneous transmission rate and an average CQI for each of the predefined number of MSs; and allocating the channel to the selected MS.

4. The system of claim 3, wherein the CQI is a signal to noise ratio.

* * * * *